A. FULLER.
CAR STEP.
APPLICATION FILED OCT. 2, 1914.

1,146,559.

Patented July 13, 1915.

2 SHEETS—SHEET 1.

Witnesses

Inventor
A. Fuller,
By Victor J. Evans
Attorney

A. FULLER.
CAR STEP.
APPLICATION FILED OCT. 2, 1914.
1,146,559.
Patented July 13, 1915.
2 SHEETS—SHEET 2.
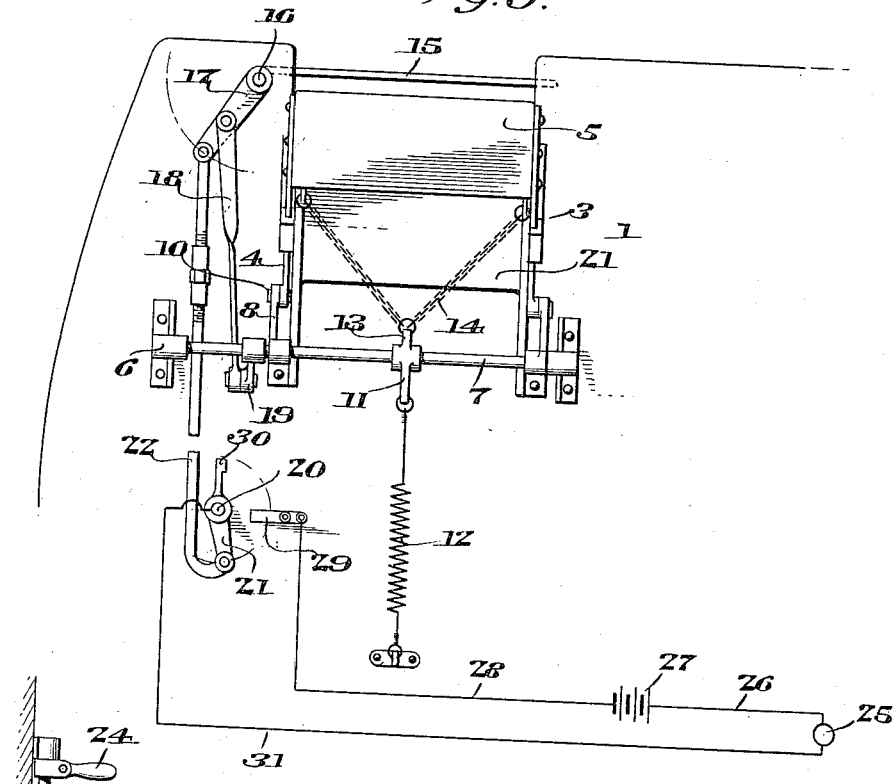
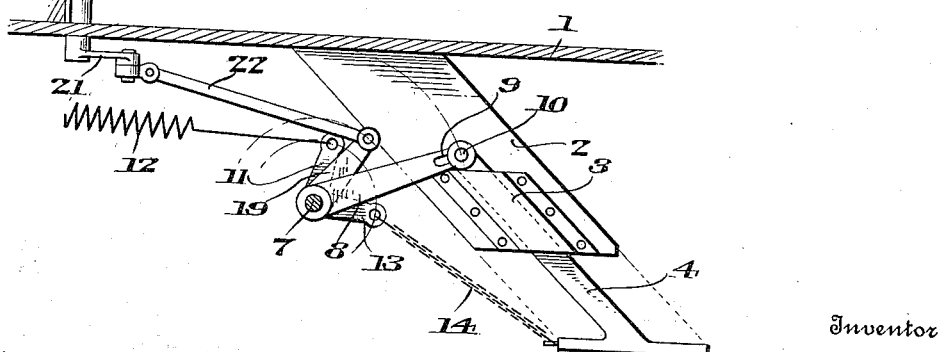
Witnesses
M. H. Slifer
M. E. Laughlin
Inventor
A. Fuller,
By Victor J. Evans
Attorney

UNITED STATES PATENT OFFICE.

ANDERSON FULLER, OF AMSTERDAM, NEW YORK.

CAR-STEP.

1,146,559. Specification of Letters Patent. Patented July 13, 1915.

Application filed October 2, 1914. Serial No. 864,662.

*To all whom it may concern:*

Be it known that I, ANDERSON FULLER, a citizen of the United States, residing at Amsterdam, in the county of Montgomery and State of New York, have invented new and useful Improvements in Car-Steps, of which the following is a specification.

This invention relates to extensible car steps and it consists in the novel features hereinafter described and claimed.

An object of the invention is to provide in combination with a set of steps permanently fixed with relation to the body of a car an extensible step movably mounted with relation to the fixed steps and means for moving the extensible step.

In one form of the invention the body of the car is provided with a door adapted to close a door opening above the fixed steps and the means which operate the movable step is connected with the said door for opening and shutting the same. Also means is provided in combination with the step moving means for sounding or giving a signal to indicate that the extensible step has been extended with relation to the fixed steps and is in position for the passengers to pass over the same.

Figure 1:
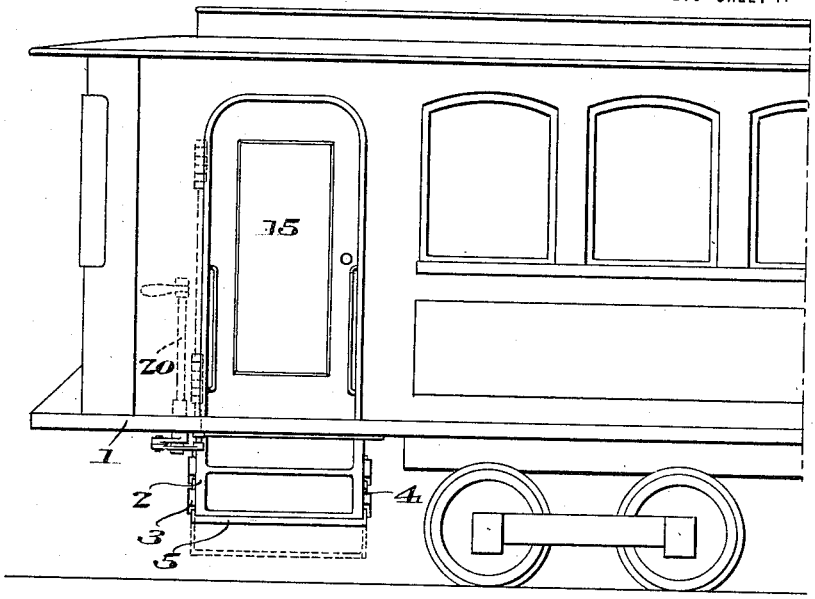
Figure 2:
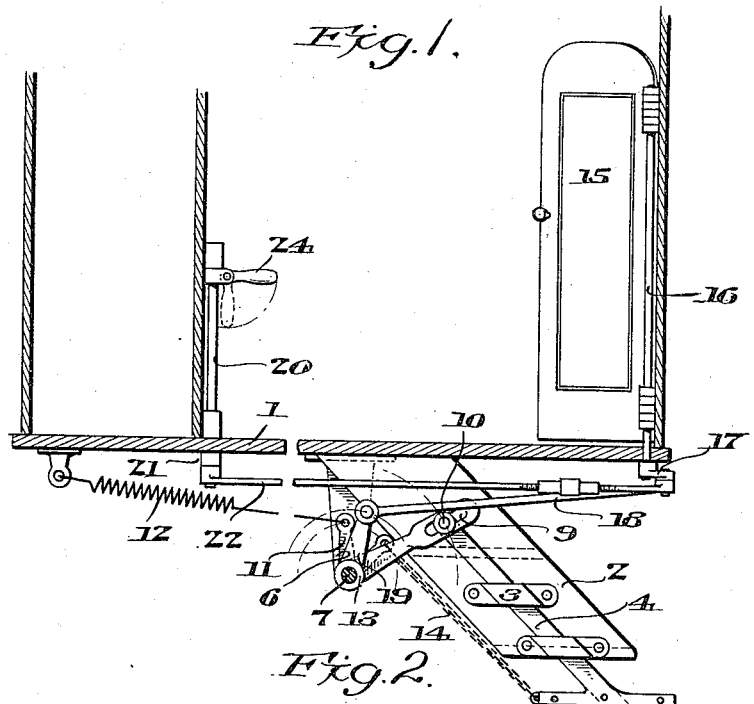

In the accompanying drawing:—Figure 1 is a side elevation of the end portion of a car having the extensible step applied thereto. Fig. 2 is a transverse sectional view of the forward portion of a car showing the step in position. Fig. 3 is a bottom plan view of the forward portion of a car and the step. Fig. 4 is a detailed sectional view of a portion of a car showing a modified arrangement of the step in elevation.

The car body 1 is provided with a set of fixed steps 2 of the usual character. Guides 3 are mounted on the sides of the fixed steps 2 and slidably receive brackets 4 which carry at their lower end portions a step 5. The step 5 and the brackets 4 attached thereto constitute the step which is referred to throughout this specification as the extensible step inasmuch as the said step 5 is movable with relation to the steps 2.

Hangers 6 depend from the body 1 of the car and a shaft 7 is journaled in the said hanger. Arms 8 are fixed to the shaft 7 and are provided in the vicinity of their outer ends with slots 9 which receive out-standing pins 10 mounted at the upper ends of the brackets 4. An arm 11 is also fixed to the shaft 7 and one end of a spring 13 is connected with the arm 11 and the other end of the said spring is attached to the body 1 of the car as best illustrated in Fig. 1 of the drawing. The spring 12 is under tension with a tendency to hold the free end of the arm 11 toward point of attachment whereby the said spring 12 is connected to the body of the car 1. Another arm 13 is fixed to the shaft 7 and chain sections 14 connect the arm 13 with the lower portion of the brackets 4 as shown in Figs. 2 and 3 of the drawing. The spring 12 acting through the arms 11, 13 and the shaft 7 together with the chains serve as means for returning the step 5 to a closed or collapsed position with relation to the steps 2.

The car body 1 is provided above the fixed steps 2 with a door opening at the side edge of which is mounted a door 15. In the form of the invention as shown in Figs. 1, 2 and 3 the shaft 16 upon which the door 15 is mounted is provided at its lower end with a crank arm 17 and the rod 18 operatively connects the crank arm 17 with the upper end portion of the arm 19 mounted upon the shaft 7. A shaft 20 is journaled at the forward portion of the car body 1 and is provided at its lower end with an arm 21 to which is pivotally connected one end of a rod 22. The other end of the rod 22 is pivotally connected to the arm 17 as best shown in Figs. 2 and 3 of the drawings. A handle 24 is pivotally connected to the upper end of the shaft 20 as shown in Fig. 2.

Therefore it will be seen that when it is desired to extend the step 5 with relation to the steps 2 an operator grasps the handle 24 and swings the same to a horizontal position as shown in heavy line in Fig. 2. By using the handle 24 the shaft 20 is carried whereby the rod 22 is moved longitudinally and the shaft 16 is turned thus moving the door 15 from a closed to an open position with relation to the door opening in the body of the car 1. At the same time the movement on the part of the arm 17 moves the rod 18 longitudinally and swings the arm 19 whereby the shaft 7 is turned and the arm 8 moved in a downward direction and the brackets 4 are moved downwardly through the guides 3 and the step 5 is carried to extended position as indicated in dotted lines in Fig. 1 with relation to the fixed steps 2. Thus at the time that the door 15 is opened the step 5 is extended with relation to the steps 2 and it is obvious that when the operation just above described is reversed the door 15 is closed and the step 5 is moved from an extended to a closed position with relation to the steps 2. As the door 15 and the step 5 are moved to a closed or collapsed position the spring 12 assists in the return movement and also serves as means for holding the parts in closed position when not in use.

In the form of the device as found in Fig. 4 of this drawing the rod 22 is connected directly with the arm 19 upon the shaft 7 and in this form of the invention no door is provided at the upper end of the set of steps 2 but the shaft 20 is connected more directly with the shaft 7 than is the case in the form of arrangement shown in Fig. 3.

In Fig. 3 of the drawing is illustrated an alarm which is operative in conjunction with the extensible step. The alarm comprises a bell 25 which is connected by means of a wire 26 with a battery 27. A wire 28 connects the battery 27 with a contact 29 and a contact 30 is mounted upon the shaft 20 and is adapted to engage the contact 29 when the shaft 20 is turned. The wire 31 connects the shaft 20 with the bell 25 and consequently it will be seen that when the shaft 20 is turned to lower the extensible step the contact 30 is moved into engagement with the contact 29 and thereby the bell 25 is sounded and a signal is given for the passengers to pass over the same.

Having thus described the invention what is claimed is:—

In combination with a car body having a set of fixed steps, an extensible step movably mounted with relation to the fixed steps, a shaft journaled upon the car body, means operatively connecting the shaft with the extensible step, spring means for returning the extensible step to a closed position with relation to the fixed steps, a door hingedly mounted upon the car body and adapted to serve as a barrier for the steps, means mounted upon the car body for swinging the door and means operatively connecting the door with the said shaft whereby the door is closed by the action of the spring means when the extensible step is closed by the spring means with relation to the fixed steps.

In testimony whereof I, affix my signature in presence of two witnesses.

ANDERSON FULLER.

Witnesses:
JAMES W. FERGUSON,
CLARA I. RAWDON.